United States Patent
Schultz et al.

(10) Patent No.: US 7,588,434 B2
(45) Date of Patent: Sep. 15, 2009

(54) FLUID DISTRIBUTOR AND TRANSLATABLE DRIVE APPARATUS FOR A MOLDING

(75) Inventors: Gregory Allan Schultz, Bolton (CA); Valentin Diaconu, Etobicoke (CA)

(73) Assignee: Husky Injection Molding Systems Ltd., Bolton, Ontario (CA)

(*) Notice: Subject to any disclaimer, the term of this patent is extended or adjusted under 35 U.S.C. 154(b) by 482 days.

(21) Appl. No.: 11/505,138

(22) Filed: Aug. 15, 2006

(65) Prior Publication Data

US 2008/0041461 A1    Feb. 21, 2008

(51) Int. Cl.
*B29C 45/80* (2006.01)

(52) U.S. Cl. .................. 425/145; 425/149; 425/150

(58) Field of Classification Search .............. 425/145, 425/149, 150
See application file for complete search history.

(56) References Cited

U.S. PATENT DOCUMENTS

| | | | |
|---|---|---|---|
| 3,510,915 A | 5/1970 | Johansson | |
| 4,714,093 A | 12/1987 | Kowano | |
| 4,717,324 A * | 1/1988 | Schad et al. | 425/130 |
| 4,731,005 A | 3/1988 | Hehl | |
| 5,101,858 A * | 4/1992 | Klotz | 137/605 |
| 5,173,312 A * | 12/1992 | Julinot | 425/145 |
| 5,545,984 A * | 8/1996 | Gloden et al. | 324/207.13 |
| 5,580,584 A * | 12/1996 | Mussler et al. | 425/143 |
| 5,665,282 A * | 9/1997 | Nakamura | 264/40.1 |
| 5,714,176 A | 2/1998 | Wurl et al. | |
| 5,792,396 A * | 8/1998 | Takizawa | 264/40.5 |
| 5,935,494 A | 8/1999 | Wurl et al. | |
| 6,068,810 A | 5/2000 | Kestle et al. | |
| 6,257,859 B1 | 7/2001 | Koda et al. | |
| 6,425,753 B1 | 7/2002 | Eppich | |
| 6,478,572 B1 | 11/2002 | Schad | |
| 7,033,158 B2 | 4/2006 | Becker et al. | |
| 7,316,553 B2 | 1/2008 | Teng et al. | |
| 2004/0156939 A1 | 8/2004 | Ickinger | |
| 2004/0213871 A1 | 10/2004 | Wohlrab et al. | |

(Continued)

FOREIGN PATENT DOCUMENTS

CA          1253308          5/1989

(Continued)

OTHER PUBLICATIONS

Extracts from the Husky G-Line brochure, Published 1999.

(Continued)

*Primary Examiner*—Tim Heitbrink

(57) ABSTRACT

Fluid distributor and operational drive of a molding system, comprising: block forming manifold for distributing fluid, block including: first interface disposed on side of the block providing connection to stationary device; second interface disposed on block configured to provide connection to electric motor: cylinder bore formed in block, bore interconnected to fluid distribution circuit, cylinder bore open includes the first interface: shaft member being a translatable member, intermediate of ends of shaft member including piston section cooperative with cylinder bore, shaft member including interface member including coupler to engage with movable machine member, other end of the shaft member including operational member, interface disposed on section of the operational member: interface member end cap providing stop for piston section; and drive cap disposed on second interface, drive cap rotatable by electric motor, and rotation of drive cap rotates the shaft member through interface while permitting translational movement of shaft member.

54 Claims, 9 Drawing Sheets

U.S. PATENT DOCUMENTS

| | | |
|---|---|---|
| 2005/0048162 A1 | 3/2005 | Teng et al. |
| 2005/0220918 A1* | 10/2005 | Wakabayashi et al. ...... 425/136 |
| 2006/0147578 A1 | 7/2006 | Konno |

FOREIGN PATENT DOCUMENTS

| | | |
|---|---|---|
| CA | 1294405 | 1/1992 |
| CA | 2122963 | 11/1994 |
| DE | 4344340 A1 | 6/1995 |
| EP | 1604755 | 12/2005 |
| JP | 9052164 A | 2/1997 |
| JP | 09239772 | 9/1997 |
| JP | 3506834 B2 | 12/2003 |

OTHER PUBLICATIONS

Extracts from the Husky Thixomolding brochure, Published 1999.
Search Report for Patent Application ROC (Taiwan) Patent Application No. 096129411 (Translation), 1 page, Jan. 28, 2009.

* cited by examiner

FLUID DISTRIBUTOR AND TRANSLATABLE DRIVE APPARATUS FOR A MOLDING

TECHNICAL FIELD

The present invention generally relates to, but not limited to, molding systems, and more particularly, to, but not limited to, (i) a fluid distributor and operational drive of a molding system and/or (ii) a molding system having a fluid distributor and operational drive, amongst other things. The fluid distributor and operational drive may be applied to either a metal molding system or a plastic molding system.

BACKGROUND

Examples of known molding systems are (amongst others): (i) the HyPET™ Molding System, (ii) the Quadloc™ Molding System, (iii) the Hylectric™ Molding System, and (iv) the HyMet™ Molding System, all manufactured by Husky Injection Molding Systems Limited (Location: Bolton, Ontario, Canada; www.husky.ca).

Prior art fluid distribution systems and operational drives of a molding system have been applied to both metal and plastic molding systems.

U.S. Pat. No. 5,714,176 (Inventor: Wurl et al; Published: Feb. 3, 1998) discloses a drive for a molding machine. A linear drive and a rotary drive driven by one motor, a servo motor, operate to rotate and translate the screw. Again, this drive comprises multiple component parts.

U.S. Pat. No. 5,935,494 (Inventor: Wurl et al; Published: Aug. 10, 1999) discloses a hybrid drive for a molding machine. A piston is translatable by a fluid to inject melt and an electric motor and transmission operate to rotate the screw. The electric motor also drives a hydraulic pump. However, this drive comprises multiple component parts, multiple manifolds, and requires a transmission.

U.S. Pat. No. 6,068,810 (Inventor: Kestle et al; Published: May 30, 2000) discloses a plasticizing unit having a plasticizing screw, an injection piston connected to the screw, a quill connected to the piston, and hydraulic cavity formed by the piston and a quill end face. Hydraulic fluid is transferred to the hydraulic cavity to move the piston and screw away from the quill. The screw and piston are subsequently moved towards the quill to displace hydraulic fluid out of the hydraulic cavity and cause back pressure. The back pressure is counteracted by acting on the back of the quill.

U.S. Pat. No. 6,478,572 (Inventor: Schad; Published: Nov. 12, 2002) discloses a drive with a single electric motor operates the screw and a hydraulic motor. Again, this drive comprises multiple component parts and associated manifolds.

United States Patent Application No. 2004/0213871 (Inventor: Wohlrab et al; Published: Oct. 28, 2004) discloses a hybrid drive for a molding machine. A piston is translatable by a fluid to inject melt and an electric motor is coupled to the screw for rotation of the screw. However, this drive also comprises multiple component parts and multiple manifolds.

United States Patent Application No. 2005/0048162 (Inventor: Teng et al; Published: Mar. 3, 2005) discloses a hybrid drive is illustrated with a hollow shaft electric motor and an external piston cylinder arrangement attached to the back end of the motor. Again this drive comprises multiple component parts and associated manifolds.

European Patent Number 1,604,755 (Inventor: Martini et al; Published: Dec. 14, 2005) discloses an injection assembly with pressure booster for pressure die-casting machines, which includes a main injection piston that is actuated by a pressurized liquid that is allowed to flow by a check valve, and a booster piston, which is arranged so that it can slide axially with respect to the main piston, wherein the multiplier piston is separated from the check valve and is arranged downstream thereof along the advancement direction of the main injection piston.

The prior art systems and drives as disclosed above appear to include separate and multiple components. For example, multiple fluid distribution manifolds, separate drives, and transmissions. They require multiple hoses, clamps, and suffer from losses. They are neither compact nor integrated with a block acting as a manifold. The hydraulic actuators tend to comprise multiple component parts held together by tie rods. Standard cone valves tend to have poor control and provide less acceleration because fluid tends to leak past the cone valve upon actuation of the valve.

Extracts from the Husky G-Line brochure (published: 1999) discloses a piston type accumulator (i) mounted directly on top of an injection unit and (ii) connected to an injection hydraulic manifold that is mounted on the injection piston cylinder end cap.

Extracts from the Husky Thixomolding brochure (published: 2003) discloses mounting of two piston type accumulators directly on top of an injection unit and connected to an injection piston cylinder end cap.

SUMMARY

According to a first aspect of the present invention, there is provided a fluid distributor and operational drive of a molding system, including, amongst other things: (i) a block, (ii) at least one fluid input port in the block, (ii) at least one fluid output port in the block, (iv) at least one fluid distribution circuit in the block communicating with the at least one fluid input port and the at least one fluid output port to distribute, in use, a fluid from the at least one fluid input port and the at least one fluid output port, and (v) a drive in the block, the drive in communication with the at least one fluid distribution circuit, the drive engageable with a translatable member, and the drive, in use, receives or discharges a fluid, to translate the translatable member.

According to a second aspect of the present invention, there is provided a molding system, including, amongst: (i) a power pack, (ii) at least one translatable member, and (iii) at least one fluid distributor and operational drive for engaging the at least one translatable member, the at lease one fluid distributor and operational drive, having, amongst other things: (a) a block, (b) at least one fluid input port in the block, the at least one fluid input port communicating with the power pack, (c) at least one fluid output port in the block, the at least one fluid output port communicating with the power pack, (d) at least one fluid distribution circuit in the block communicating with the at least one fluid input port and the at least one fluid output port to distribute, in use, a fluid from the at least one fluid input port and the at least one fluid output port, and (e) a drive in the block, the drive in communication with the at least one fluid distribution circuit, the drive engageable with an translatable member, and the drive, in use, receives or discharges a fluid, to translate the translatable member.

In an embodiment, the drive is a cylinder that in use receives or discharges a fluid to translate a shaft member engageable with the translatable member. The cylinder may be formed directly in material of the block, or the cylinder may be formed in a separate material insert. The separate material insert is disposed in the block. The piston is disposed within the cylinder. The shaft member engageable with the translatable member for translating the member.

In an embodiment, seals are included intermediate the cylinder and the piston.

The at least one fluid circuit may be formed directly in material of the block. The at least one fluid circuit may include internal circuits formed directly in material of the block and external circuits connected to the block. At least one energy storage device port may be included and the port is in communication with the at least one fluid circuit. The at lease one energy storing device port may be integral with the block.

The at least one energy storage device may be mounted on the at least one energy storage device port. At least two energy storing device may be in communication with at least one fluid circuit. The at least two energy storing device may have different capacities for storing energy or they may have the same capacities for storing energy. The at lest two energy storing device may also be aligned with the same fluid circuit or different fluid circuits.

The at least one output port in communication with a valve to control, in use, a flow of fluid. The valves may be integral with the drive bock, or the valves may be directly coupled with the drive block. The valves may be indirectly coupled with the drive block. The valves may be proportional or non-proportional.

In an embodiment, the cylinder includes a piston bore. The drive apparatus may also include an interface member end cap for sealing an end of the piston bore. The interface member end cap has a central bore for receiving an interface member. The interface member end cap further including a seal for sealing engagement with an interface member. The piston further may include an interface member at an end of the piston. The interface member extending through the end cap for engaging the translatable member. The interface member may further include a coupler for coupling to a translatable member.

The drive apparatus may further include a position sensor for determining, in use, a position of the translatable member, or the interface member.

In an embodiment, the position sensor is a TEMPOSONIC™ rod and the piston includes an axial bore to house an end of the TEMPOSONIC™ rod.

The piston may further include an interface member for engaging, in use, the translatable member and an interface member end cap for sealing the cylinder. The interface member end cap including a central bore for receiving the interface member. The interface member end cap further including a seal for sealing engagement with the interface member.

There are a number of technical effects, amongst other technical effects, of the aspects of the present invention. There is a reduction in separate components providing fluid distribution and drive capability. Multiple manifolds are reduced with many hoses, clamps, and losses reduced. The drive is compact having an integrated manifold and translational drive, and an additional rotational drive secured to the manifold.

BRIEF DESCRIPTION OF THE DRAWINGS

A better understanding of the exemplary embodiments of the present invention (including alternatives and/or variations thereof) may be obtained with reference to the detailed description of the exemplary embodiments along with the following drawings, in which.

The drawings are not necessarily to scale and are sometimes illustrated by phantom lines, diagrammatic representations and fragmentary views. In certain instances, details that are not necessary for an understanding of the embodiments or that render other details difficult to perceive may have been omitted.

DETAILED DESCRIPTION OF THE EXEMPLARY EMBODIMENTS

Figure 1:
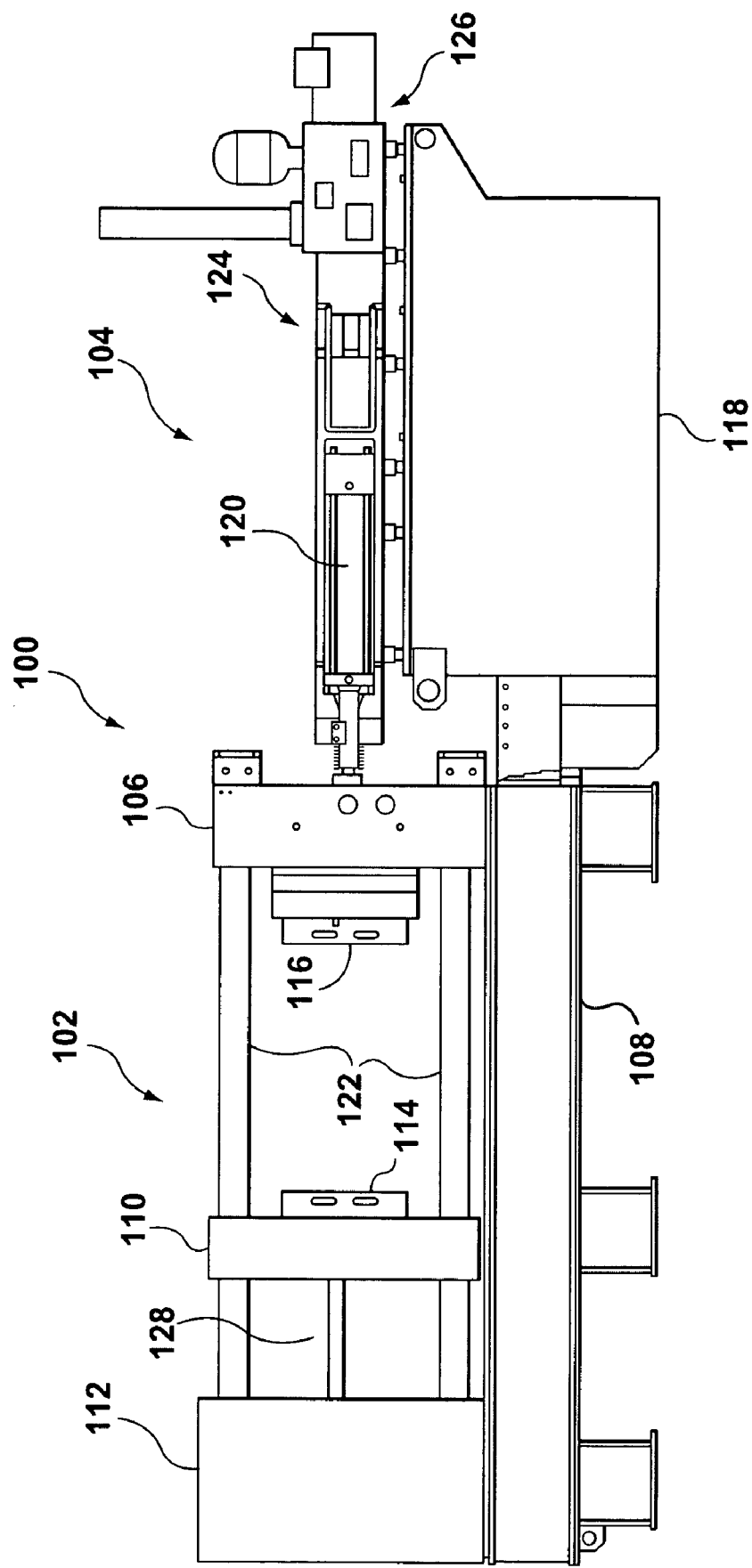
FIG. 1 is a schematic side view representation of an injection molding system.
Figure 2:
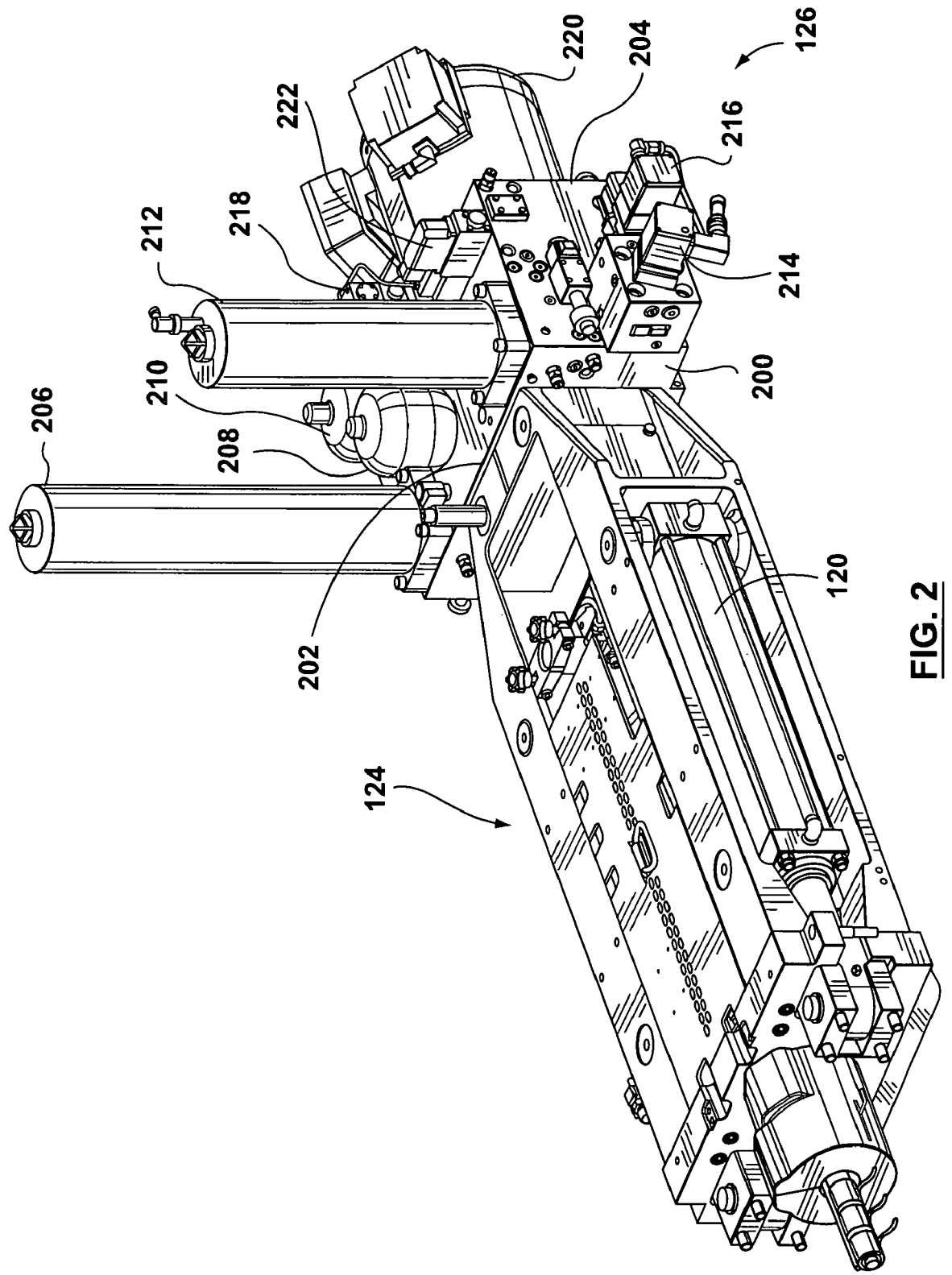
FIG. 2 is a perspective side view representation of an injection unit and corresponding drive.
Figure 3:
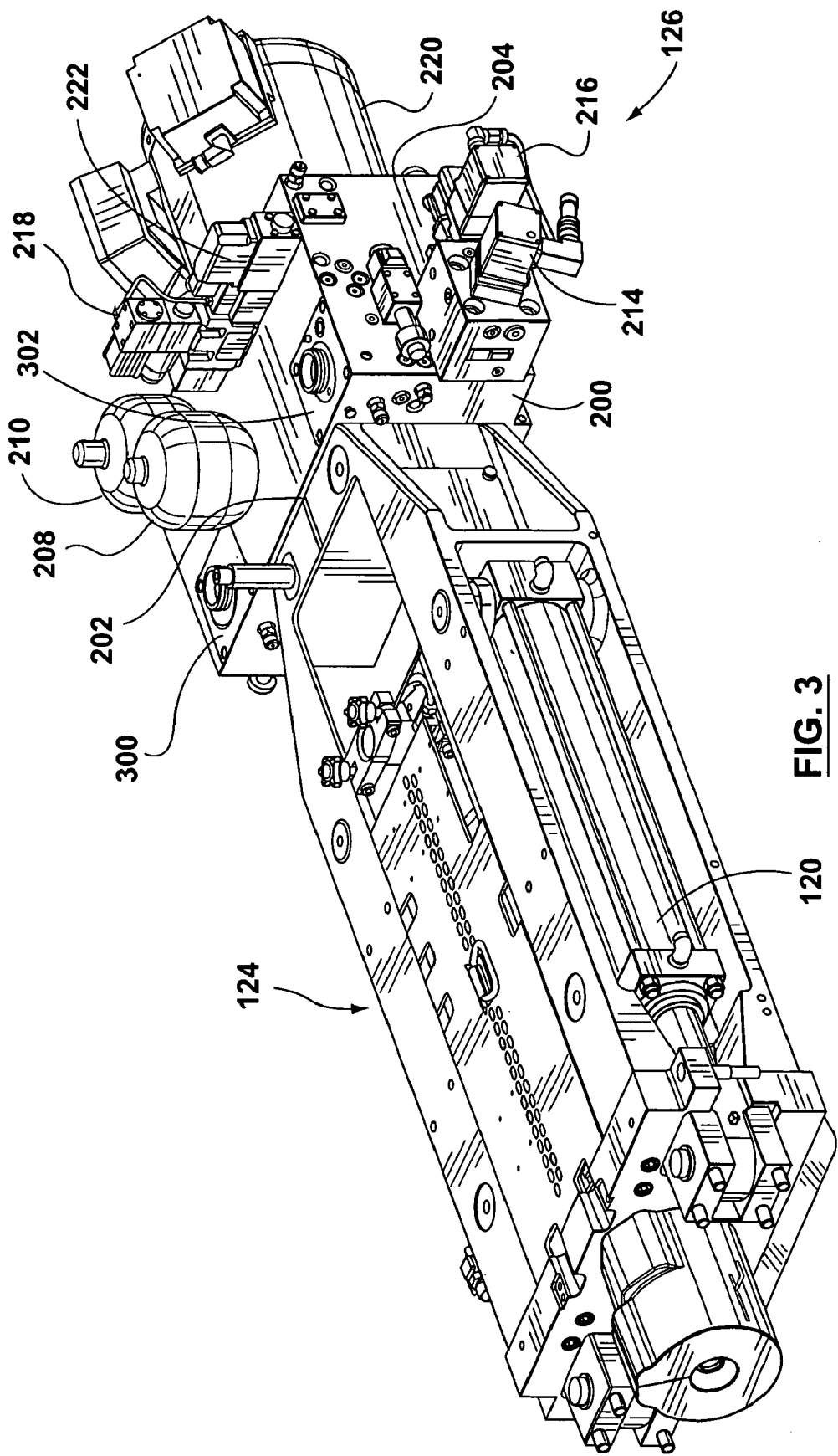
FIG. 3 is a perspective side view representation of an injection unit and corresponding drive with two energy storage devices removed.
Figure 4:
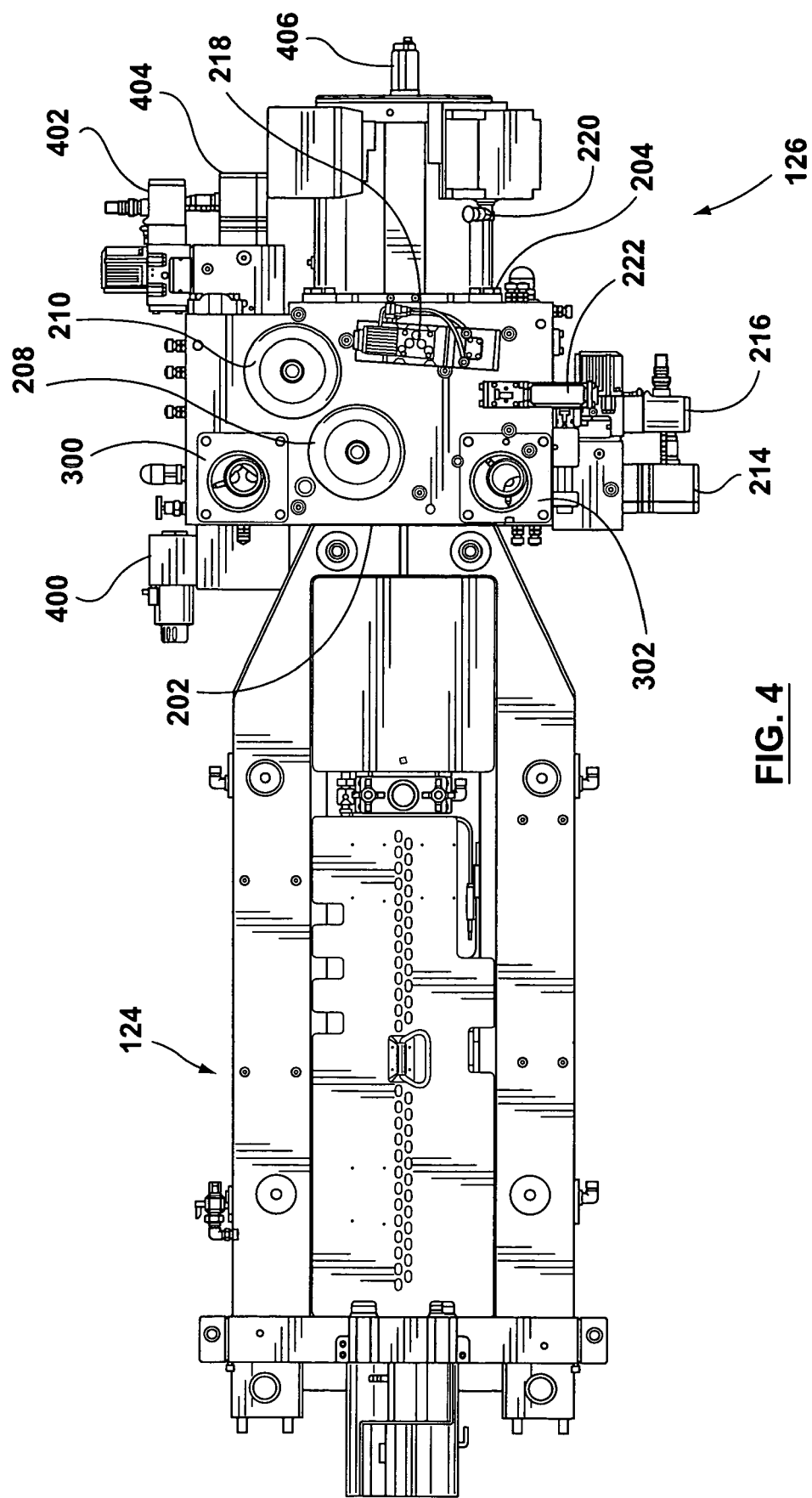
FIG. 4 is a top view representation of an injection unit and corresponding drive with two energy storage devices removed.

FIG. 1 depicts an embodiment of a molding system 100. The molding system 100 may be a plastics injection molding system, a metal injection molding system, or a hybrid plastics/metal molding system. The molding system 100 includes, amongst other things, an injection unit 104 and a clamp unit 102.

The clamp unit 102 includes a stationary platen 106 and a moving platen 110. A clamp block 112 and clamp column 128 may also be associated with the moving platen 110. The clamp block 112 and the stationary platen 106 are interconnected by four tie bars 122. The stationary platen 106 and clamp block 112 are supported by the frame 108. A mold hot half 116 may be mounted to a face of the stationary platen 106. The mold hot half 116 may also include a hot runner, or may be of the cold runner type. A least one cavity is located with the mold hot half 16. A mold cold half 114 may be mounted to a face of the moving platen 110. At least one core is located with the mold cold half 114. The cavity and the core provide a space to form a part. The molding system 100 also includes a control system to operate the molding process and control the molding system.

Operational power is provided to the moving platen 110. In an embodiment, the fluid distributor and operational drive is a bidirectional drive capable of rotating a locking nut piston onto interrupted teeth of the clamp column 128, and translating the clamp column 128 to provide tonnage to the mold. In another embodiment, the fluid distributor operational drive is a translatable drive capable of translating the moving platen 110.

The injection unit 104 includes a carriage and barrel 124 supported on the frame 118. The carriage includes carriage cylinders 120 on each side. One end of each carriage cylinder 120 is coupled to the stationary platen 106 of the clamp unit 102. The carriage cylinders 120 are actuated through hydraulics and provide an ability to move the carriage and barrel 124 towards and away from the stationary platen 106. Mounted on an end of the carriage is a fluid distributor and operational drive 126.

In an embodiment, operational power is provided to a reciprocating screw located within the barrel. In this embodiment, the fluid distributor and operational drive 126 is a bidirectional drive (that is, a fluid distributor and bidirectional drive apparatus 126) that is capable of translating the screw and rotating the screw. In another embodiment, the fluid distributor and operational drive 126 is a translatable drive capable of translating an injection piston in a shooting pot of a two stage, or P type injection unit 104.

In addition, those skilled in the art will appreciate that either the translatable drive version or the bidirectional drive version may be applied to other aspects of the injection unit 104, clamp unit 102, or molding system 100 to translate, and/or translate and rotate operational members associated with the machine. In addition, both versions of the fluid distributor and operational drive 126 may distribute fluid to other hydraulically actuated devices on the injection unit 104, clamp unit 102, or molding system 100.

FIGS. 2, 3, 4, 5, and 6 depict the fluid distributor and operational drive 126. A block 200 forms a manifold for distributing fluid, for example, hydraulic oil. The block 200 includes at least one fluid inlet port, at least one fluid outlet port, and a fluid distribution circuit (not depicted). The fluid distribution circuit is preferably formed in the block 200 material (as internal circuit and/or circuits). According to variant, the fluid distribution circuit is formed by external circuits, such as hoses. According to another variant, the fluid distribution circuit may be a combination of internal and external circuits.

At least one control valve (214, 216, 218, 222, 400, 402, and 404) interacts with the fluid distribution circuit to control the flow of fluid to various devices, for example, the carriage cylinders 120. The at least one control valve (214, 216, 218, 222, 400, 402, and 404) may be integral with the block 200 or external to the block 200 or a combination of internal and external. In addition, the at least one control valve (214, 216, 218, 222, 400, 402, and 404) may be proportional or non-proportional depending upon the requirements of the various devices.

The valve to control the drive 838 (reference is made to FIG. 8) for injection may be a spool cut valve, such as (but not limited to), the Model DSHR40 V01 Spool manufactured by MOOG Hydrolux (www.moog.com), for improved control and acceleration of the injection process. With this type of valve, there is no flow or leakage of fluid for the first 3.5 mm of spool travel. The first 3.5 mm of spool travel is called the "dead band". The dead band provides for a higher (improved) acceleration (it is optional to use a spool cut valve that has a dead band or that has no a dead band).

Since persons skilled in the art of molding systems have a base line of knowledge, further details are not provided for (i) the valves, (ii) the hydraulic circuit, (iii) examples of what the valves control, and/or (iv) examples of the hydraulic circuits needed for the case of the injection unit and/or the case of a clamp unit.

A first interface 202 (reference is made to FIG. 3) is disposed on one side of the block 200. The first interface 202 provides a mount and connection to a device, for example, to the carriage and barrel 124. Alternatively, the first interface 202 could provide a mount and connection to a moving platen 110 for applying tonnage, or movement, or both.

A second interface 204 is disposed on an opposite side of the block 200. The second interface 204 provides a mount and connection to an electric motor 220, preferably, a hollow shaft electric motor. Alternatively, the second interface 204 provides a mount and connection to a hydraulic motor, or an electric motor.

Optionally, at least one energy storage device port (300, 302) in the block 200 interacts with the fluid distribution circuit to receive and store a volume of fluid. Connected to the at least one energy storage device port (300, 302) is at least one energy storage device (206, 208, 210, 212). The at least one energy storage device (206, 208, 210, 212) may be external to the block 200 or internal to the block 200. When more than one energy storage device (206, 208, 210, 212) is applied, they may be of equal capacity or differing capacity depending upon the needs of the system.

Figure 5:
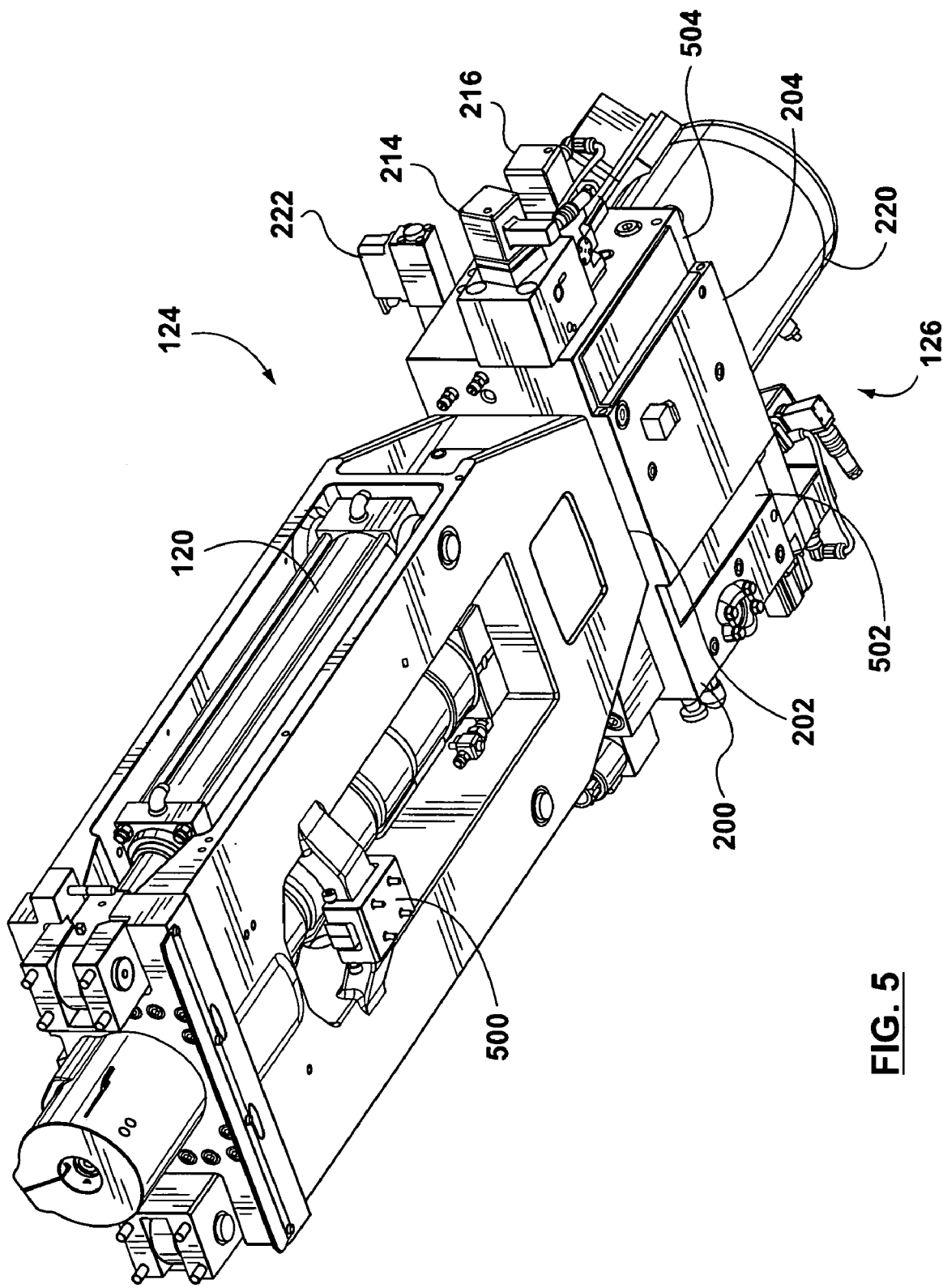
FIG. 5 is a perspective bottom view representation of an injection unit and corresponding drive.
Figure 6:
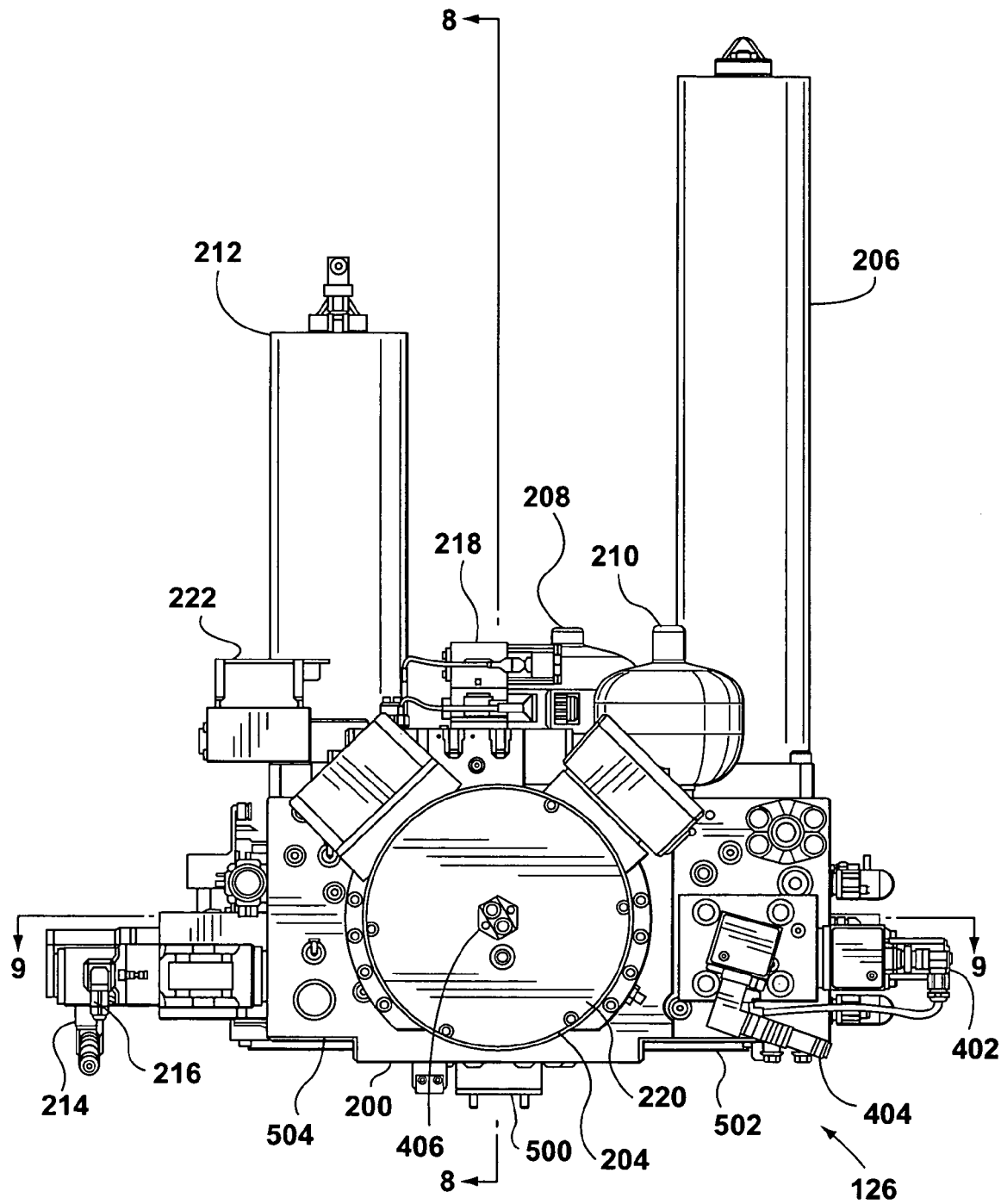
FIG. 6 is an end view representation of the corresponding drive.

FIG. 5 and FIG. 6 depict an injection unit mount. A tripod mount is formed between the injection unit 104 and the injection unit frame 118. A first mount 502 (also called a wear pad) is formed or disposed on one side of the block 200. A second mount 504 (also called a wear pad) is formed or disposed on the other side of the block 200. The first mount 502 and the second mount 504 interface with rails and guides to permit or accommodate fore and aft sliding (slidable) adjustment of the carriage and barrel 124. The first mount 502 and the second mount 504 may be formed in the block 200 material or be a component attached to the block 200 material.

Figure 7:
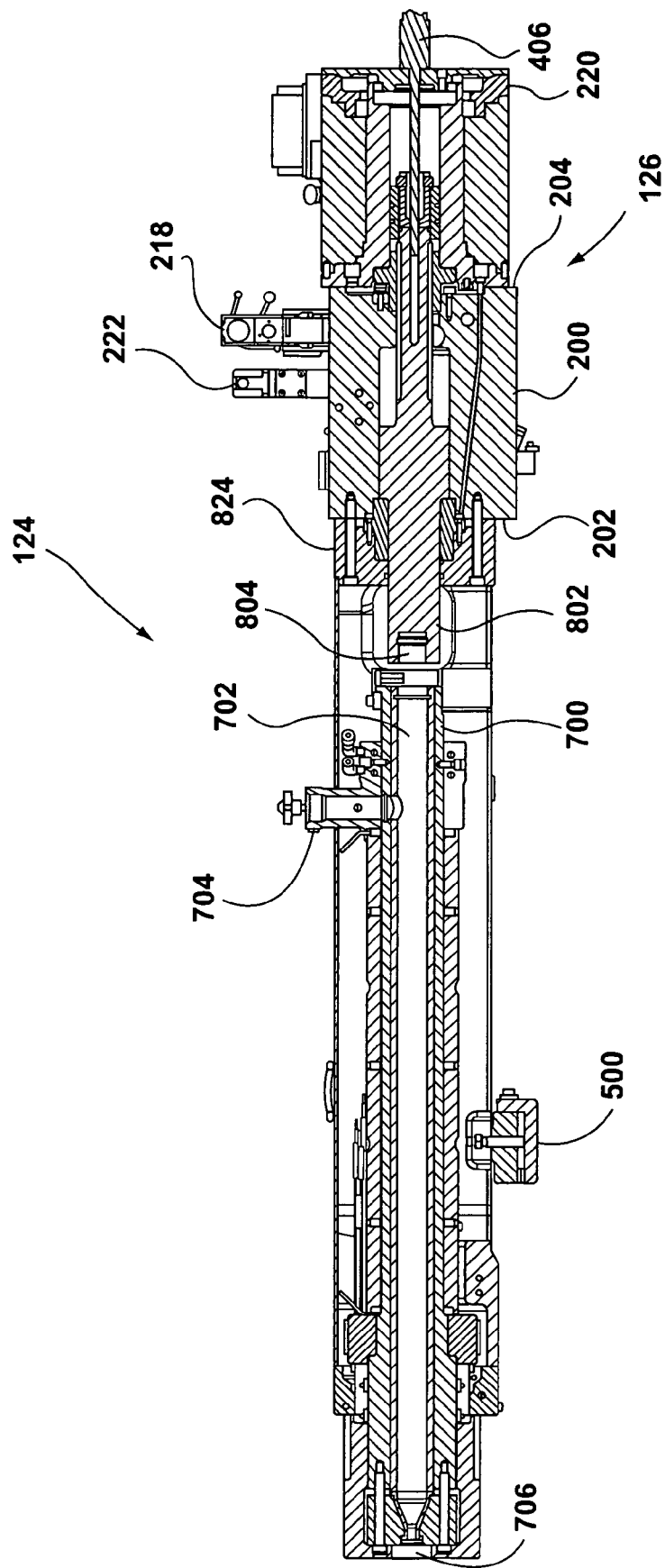
FIG. 7 is a cross sectional side view representation taken along line 8-8 from FIG. 6 illustrating an injection unit and corresponding drive.

The third mount 500 is disposed on a frame member of the carriage. The third mount 500 is adjustable about the horizontal and vertical axes. Adjusting the third mount 500 provides alignment of the barrel 700 (reference is made to FIG. 7) with a mold or sprue bushing. The third mount 500 interfaces with a rail and guide on the injection unit frame 118. The third mount 500 is adjustable about the vertical axis to provide an up/down adjustment, and about the lateral axis to provide a left/right adjustment of the barrel. This provides a fine adjustment of the barrel (and thus of the machine nozzle that is mounted to the barrel). Based on the foregoing description, the binding of the aft linear bearings should not occur, and it is not necessary to mount an injection unit via a tripod mount.

Figure 8:
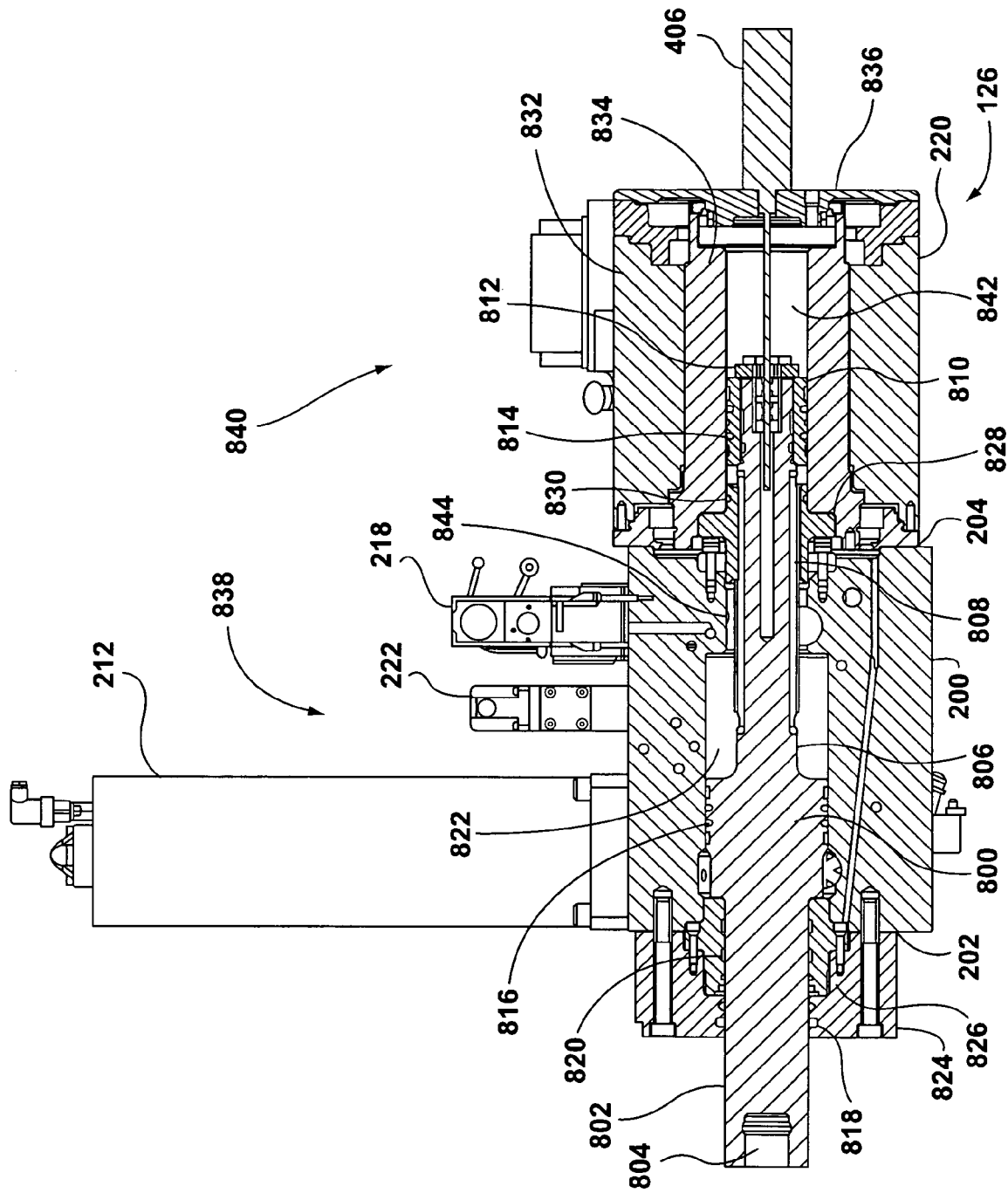
FIG. 8 is an enlarged cross sectional side view representation taken along line 8-8 from FIG. 6 illustrating the corresponding drive.
Figure 9:
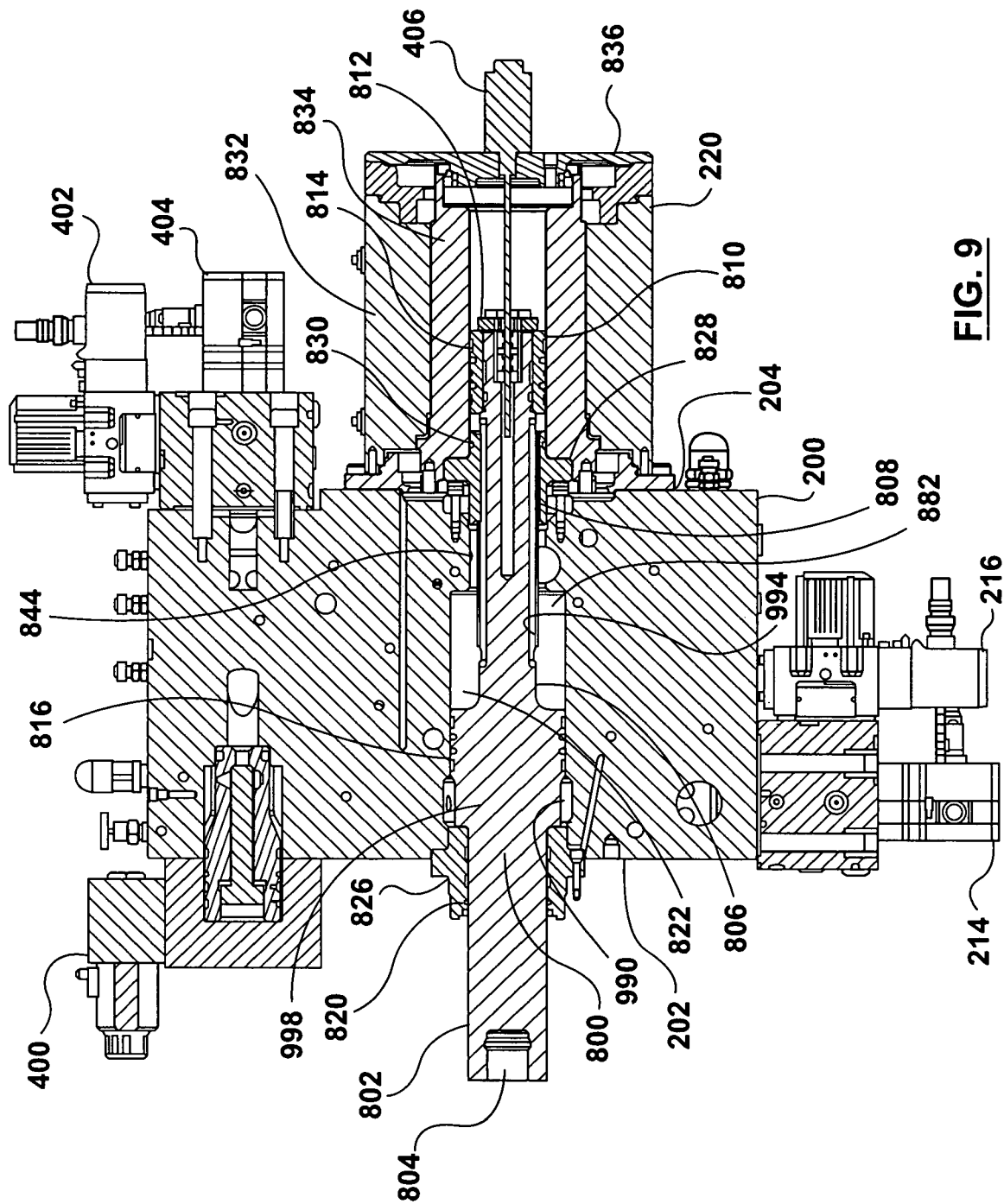
FIG. 9 is an enlarged cross sectional top view representation taken along line 9-9 from FIG. 6 illustrating the corresponding drive.

Referring ahead to FIG. 8 and FIG. 9, there is depicted the fluid distributor and operational drive 126. A block 200 forms a manifold for the distribution of a fluid such as hydraulic oil. The block 200 includes an inlet and an outlet to receive and discharge fluid. The block 200 also includes at least one fluid circuit as illustrated by the various bores and lines in the sectional view of the block 200. Multiple circuits are provided for controlling multiple devices in addition to the drive 838. Valves (214, 218, 400, 402) connect to the fluid circuit through bore channels in the block 200. A valve may be mounted on the block 200 or integral with block as shown with valve 400. The valves control the flow of fluid from the fluid circuit to a machine member for actuation by the fluid. A cylinder bore 822 is formed in the block 200, preferably about a central area of the block 200. Alternatively, the cylinder bore 822 may be formed out of a liner or insert material disposed within a bore of the block 200. The cylinder bore 822 is of a diameter to receive a piston section 998 for reciprocation by the fluid. The cylinder bore 822 is also interconnected to the fluid circuit of the block 200. One end of the cylinder bore 822 is open to the surface of the block 200 that includes the first interface 202. A second smaller diameter pass thru bore 844 is formed in an opposite end of the cylinder bore 822 for receiving and passing a portion of a shaft member 800. The shaft member 800 is a translatable member and/or a bidirectional member.

The shaft member 800 is an elongate generally cylindrical member. One end of the shaft member 800 includes an interface member 802. The interface member 802 could be integral with the shaft member 800 or separate. The interface member 802 may include a coupler 804 or suitable interface at one end for engagement with a machine member. The coupler may be a threaded bore, but other forms of couplers are contemplated. The other end of the shaft member 800 includes an operational member 806. Again the operation member 806 could be integral with the shaft member 800 or separate. Intermediate the ends of the shaft member 800 is a piston section 998 (also called a piston 998) for cooperation with cylinder bore 822. Intermediate the piston section 998 (also called a piston) and the cylinder bore 822 are seals 816. Disposed on a section of the operational member 806 is an interface 808. Preferably, the interface 808 portion on the operational member 806 is a spline. The spline is of a diameter smaller than the diameter of the pass thru bore 844 such that rotation of the shaft member 800 does not interfere with the splines and pass thru bore 844.

A surface of the block 200 with the first interface 202 and an inside diameter of the cylinder bore 822 cooperate to receive an interface member end cap 826. The interface member end cap 826 may include a support bearing for the interface member 802 as well as seals (seals/bearings generally illustrated as 820). A surface of the interface member end cap 826 provides a stop for the piston section 998 of the shaft member 800. While the interface member end cap 826 is illustrated bolted to the carriage mount 824, alternatively the interface member end cap 826 could be bolted or secured directly to the block 200.

The carriage mount 824 interconnects the carriage and barrel 124 to the first interface 202 of the block 200. The carriage mount 824 may also include bearings for support of the interface member 802 as well as additional seals (seals/bearing generally illustrated as 818).

A drive cap 828 is disposed on a surface of the second interface 204 of the block 200. The drive cap 828 has a central opening and complementary interface 808. Preferably, the interface 808 portion of the drive cap 828 is a spline for complementary engagement with the spline of the operational member 806. The drive cap 828 is secured to the block 200 by fasteners. The drive cap 828 is rotatable by a motor. Preferably the drive cap 828 communicates with the rotor of a hollow shaft electric motor for rotation of the drive cap 828. Rotation of the drive cap 828 rotates the shaft member 800 through the interface 808 while permitting translational movement of the shaft member 800. The drive cap may include bearings and seals (generally illustrated as 830).

An end of the operational member 806 includes a smaller diameter section to receive a second piston member 810 (which may also be called a piston). The second piston member 810 is retained over the smaller diameter section by a shoulder formed on the smaller diameter section engaging an end surface of the second piston member 810 and a piston member end cap 812 secured to the end of the operational member 806. The outer diameter of the second piston member 810 is sized to ensure the second piston member 810 fits within the hollow shaft of the motor 220. The hollow shaft of the motor 220 forms a cylinder 842. The second piston member 814 may include seals or rings 814 intermediate an outer surface of the second piston member 814 and the surface of the cylinder 842. The second piston member 814 may reciprocate within the cylinder 842 during operation of the drive.

The piston member end cap 812 may be secured to the end of the operational member by bolts or threads. The piston member end cap 812 may also include a central opening to receive a sensor 406 for determining a position of the shaft member 800.

The motor 220 includes a stator 832, a hollow shaft rotor 834, and mount for securing the motor 220 to the block 200 at the second interface 204. The hollow shaft rotor 834 may be directly or indirectly engaged to the drive cap 828 such that rotation of the rotor provides a rotation of the drive cap 828, or a component of the drive cap 828. The motor end cap 836 also includes a central bore to receive a position sensor 406.

A position sensor 406 provides positional information signals to indicate the position of the shaft member 800. Preferably the position sensor 406 is a TEMPOSONIC™ rod (manufactured by MTS Systems Corporation, Sensors Division of the U.S.A.; Telephone: 919.677.0100; http://www-.mtssensors.com). A portion of the position sensor 406 is disposed within a small diameter central bore located in the operational member 806 and the position sensor 406 is mounted on an end of the motor 220, with a portion extending into the central area of the motor 220.

In summary, the fluid distributor and operational drive 126 includes a first drive 838 formed in the block 200 by the combination of the cylinder 822 and shaft member 800 to provide translational movement. The drive 126 also includes a second drive 840 formed by the motor 220 and shaft member 800 to provide rotational movement.

Referring back to FIG. 7, there is depicted an exemplary embodiment of the fluid distributor and operational drive 126 with respect to the connection to a carriage and operation of a screw in a barrel 700. The first interface 202 of the block 200 provides for alignment and connection to the carriage mount 824 and is secured by bolts. The coupler 804 of the interface member 802 provides a connection to a screw (not shown) disposed in the bore 702 of the barrel 700. The barrel includes an input port 704 for receiving material and an exit port 706 for injecting a shot of melted material.

The fluid distributor and operational drive 126 operates as a bidirectional drive, power and control is applied to the motor 220 which in turn rotates the shaft member 800 and the screw in the barrel 700. Feedstock (plastic or metal chips) is supplied to the input port 704 and is conveyed foreword in the barrel by the rotating screw. As a shot of melt accumulates in front of the screw, the screw moves aft which causes the shaft member 800 to move aft. The shaft member 800 moves aft in the cylinder 822 and aft into the hollow shaft rotor 834 of the motor 220. Once the desired amount of shot has been accumulated in front of the screw, fluid pressure is applied to the cylinder 822 in the block 200 to translate the shaft member 800 and screw forward to inject the shot into a mold.

The piston 998 and the second piston member 810 cooperate in accordance with the following approaches: (i) the cylinder bore 822 is pressurizable by a hydraulic fluid that is fluidly transmitted to the cylinder bore 822 while a cylinder 900 is connected to tank (that is, connected to tank pressure) so that once the hydraulic fluid located in the cylinder bore 822 is pressurized, the piston 998 is made to move or translate, and/or (ii) defined between the piston 998 and the second piston member 814 there is a channel 994 that is used to fluidly communicate (using the hydraulic fluid) the piston 998 with the second piston member 810, so that when the second piston member 810 is made to translate via actuation of the electric motor 220 (actuation of the electric motor 220 causes the piston 814 to move, which in turn move the fluid through the channel 994 and then the fluid pushes against the piston 998), the fluid in the channel 994 becomes pressurized so as to, in turn, pressurize the cylinder bore 822 which then permits translation of the piston 998.

Alternatively, the fluid distributor and operational drive 126 operates as a bidirectional drive for applying tonnage to a mold, power is applied to the motor 220 which in turn rotates a locking piston nut about the clamp column 128 to engage complementary teeth on the nut with the clamp column 128. Fluid pressure is applied to the cylinder 822 in the block 200 which translates the clamp column 128 and applies pressure to the mold. Once cooling of the part has completed, fluid pressure is removed from the cylinder 822 in the block 200 and the locking piston nut is again rotated by the motor 220 such that the complementary teeth are disengaged. Then the moving platen may be moved to open the mold.

Alternatively, the fluid distributor and operational drive 126 operates as a translatable drive for a shooting pot, a shot of melt is transferred into the shooting pot moving an injection piston aft which causes the shaft member 800 to move aft. Once the desired amount of shot has been transferred into the shooting pot, fluid pressure is applied to the cylinder 822 in the block 200 to translate the shaft member 800 and shooting pot piston forward to inject the shot into the mold.

Alternatively, the fluid distributor and operational drive 126 operates as a translatable drive for stroking a mold. Fluid pressure may be applied on either side of the piston member 810 in the cylinder 822 of the block 200 to translate the shaft member 800. The drive 126 is disposed intermediate the moving platen 110 and the stationary platen 106 and operations to move the moving platen 110.

For the alternatives wherein the fluid distributor and operational drive 126 operates as a translatable drive, the second drive 840 is not present and the drive cap 828 simply provides a seal between the block 200 and the operational member 806.

In addition to the exemplary alternatives of the fluid distributor and operational drive 126, the at least one valve (214, 216, 218, 222, 400, 402, 404) also receives fluid from the at least one fluid circuit and may open and close to control other devices on the system when required by the process.

The description of the exemplary embodiments provides examples of the present invention, and these examples do not limit the scope of the present invention. It is understood that the scope of the present invention is limited by the claims. The exemplary embodiments described above may be adapted for specific conditions and/or functions, and may be further extended to a variety of other applications that are within the scope of the present invention. Having thus described the exemplary embodiments, it will be apparent that modifications and enhancements are possible without departing from the concepts as described. It is to be understood that the exemplary embodiments illustrate the aspects of the invention. Reference herein to details of the illustrated embodiments is not intended to limit the scope of the claims. The claims themselves recite those features regarded as essential to the present invention. Preferable embodiments of the present invention are subject of the dependent claims. Therefore, what is to be protected by way of letters patent are limited only by the scope of the following claims:

What is claimed is:

1. A fluid distributor and operational drive of a molding system, comprising:
   a block forming a manifold for distributing a fluid, the block including:
      a fluid distribution circuit having at least one fluid inlet port and at least one fluid outlet port;
      a first interface being disposed on a side of the block, the first interface providing a mount and connection to a stationary device;
      a second interface being disposed on an opposite side of the block, the second interface being configured to provide a mount and connection to an electric motor;
      a cylinder bore being formed in the block, the cylinder bore being interconnected to the fluid distribution circuit, one end of the cylinder bore being open to a surface of the block that includes the first interface;
   a shaft member being translatable member, intermediate of the ends of the shaft member including a piston section being cooperative with the cylinder bore, the cylinder bore being of a diameter to receive the piston section for reciprocation by the fluid of the fluid distribution circuit, and seals being intermediate the piston section and the cylinder bore, a pass thru bore being formed in an opposite end of the cylinder bore for receiving and passing a portion of the shaft member, one end of the shaft member including an interface member, the interface member including a coupler being configured to engage with a movable machine member, the other end of the shaft member including an operational member, an interface being disposed on a section of the operational member;
   a surface of the block with the first interface and an inside diameter of the cylinder bore being cooperative to receive an interface member end cap, and a surface of the interface member end cap providing a stop for the piston section of the shaft member; and
   a drive cap being disposed on a surface of the second interface of the block, the drive cap being rotatable by the electric motor, and rotation of the drive cap rotates the shaft member through the interface while permitting translational movement of the shaft member.

2. A fluid distributor and operational drive as in claim 1 wherein:
   the electric motor includes a hollow shaft; and
   an end of the operational member includes a section for receiving a second piston member, the second piston member being retained by a shoulder formed on a section engaging an end surface of the second piston member and a piston member end cap being secured to the end of the operational member, an outer diameter of the second piston member being sized to ensure the second piston member fits within the hollow shaft of the electric motor,
   the hollow shaft of the electric motor forming a cylinder, and the second piston member being configured to reciprocate within the cylinder during operation.

3. A fluid distributor and operational drive as in claim 2 wherein:
   an interface portion of the drive cap includes a spline for complementary engagement with the spline of the operational member.

4. A fluid distributor and operational drive as in claim 2 wherein:
   a carriage mount interconnects a carriage and a barrel to the first interface of the block.

5. A fluid distributor and operational drive as in claim 1, wherein:
   the electric motor includes a hollow shaft; and
   the drive cap communicates with a rotor of the hollow shaft for rotation of the drive cap.

6. A fluid distributor and operational drive as in claim 2, wherein:
   the piston member end cap includes a central opening to receive a position sensor for determining a position of the shaft member.

7. A fluid distributor and operational drive as in claim 1 wherein:
   the electric motor includes:
   a stator;
   a hollow shaft rotor being configured to interact with the stator; and
   a mount for securing the electric motor to the block at the second interface, the hollow shaft rotor engages the drive cap such that rotation of the hollow shaft rotor provides a rotation of the drive cap.

8. A fluid distributor and operational drive as in claim 1 wherein the at least one fluid circuit is formed directly in material of the block.

9. A fluid distributor and operational drive as in claim 1 wherein the at least one fluid circuit includes internal circuits formed directly in material of the block and external circuits connected to the block.

10. A fluid distributor and operational drive as in claims 1, 2, 3, or 4 further comprising at least one energy storage device port, the at least one energy storage device port in communication with the at least one fluid circuit.

11. A fluid distributor and operational drive as in claim 10 wherein the at least one energy storing device port is integral with the block.

12. A fluid distributor and operational drive as in claim 10 wherein the at least one energy storage device is mounted on the at least one energy storage device port.

13. A fluid distributor and operational drive as in claims 1, 2, 3, or 4 further comprising at least two energy storing devices, the at least two energy storing devices in communication with the at least one fluid circuit.

14. A fluid distributor and operational drive as in claim 13 where the at least two energy storing devices have different capacities for storing energy.

15. A fluid distributor and operational drive as in claim 13 wherein the at least two energy storing devices have the same capacities for storing energy.

16. A fluid distributor and operational drive as in claim 13 wherein the at least two energy storing devices are aligned to the same fluid circuit.

17. A fluid distributor and operational drive as in claim 13 wherein the at least two energy storing devices are aligned with different fluid circuits.

18. A fluid distributor and operational drive as in claim 1 wherein the at least one output port in communication with a valve to control, in use, a flow of the fluid.

19. A fluid distributor and operational drive as in claim 18 wherein the valve is integral with the block.

20. A fluid distributor and operational drive as in claim 18 wherein the valve is directed coupled with the block.

21. A fluid distributor and operational drive as in claim 18 wherein the valve is indirectly coupled with the block.

22. A fluid distributor and operational drive as in claims 18, 19, 20, or 21 wherein the valve is a proportional valve.

23. A fluid distributor and operational drive as in claims 18, 19, 20, or 21 wherein the valve is a non-proportional valve.

24. A fluid distributor and operational drive as in claim 5 wherein the drive is a cylinder, the cylinder includes a piston bore.

25. A fluid distributor and operational drive as in claim 1 wherein the interface member end cap has a central bore for receiving the interface member, the interface member end cap further including a seal for sealing engagement with the interface member.

26. A fluid distributor and operational drive as in claim 1 further comprising:
a position sensor for determining, in use, a position of the operational member.

27. A fluid distributor and operational drive as in claims 26 wherein the position sensor is a rod, and the piston section includes an axial bore to house an end of the rod.

28. A fluid distributor and operational drive as in claim 1 wherein the interface member end cap has a central bore for receiving the interface member, the interface member end cap further including a seal for sealing engagement with the interface member.

29. A molding system, comprising:
a power pack;
at least one translatable member; and
at least one fluid distributor and operational drive for engaging the at least one translatable member, the at least one fluid distributor and operational drive, comprising:
a block forming a manifold for distributing a fluid, the block including:
a fluid distribution circuit having at least one fluid inlet port and at least one fluid outlet port;
a first interface being disposed on a side of the block, the first interface providing a mount and connection to a stationary device;
a second interface being disposed on an opposite side of the block, the second interface being configured to provide a mount and connection to an electric motor;
a cylinder bore being formed in the block, the cylinder bore being interconnected to the fluid distribution circuit, one end of the cylinder bore being open to a surface of the block that includes the first interface;
a shaft member being translatable member, intermediate of the ends of the shaft member including a piston section being cooperative with the cylinder bore, the cylinder bore being of a diameter to receive the piston section for reciprocation by the fluid of the fluid distribution circuit, and seals being intermediate the piston section and the cylinder bore, a pass thru bore being formed in an opposite end of the cylinder bore for receiving and passing a portion of the shaft member, one end of the shaft member including an interface member, the interface member including a coupler being configured to engage with a movable machine member, the other end of the shaft member including an operational member, an interface being disposed on a section of the operational member;
a surface of the block with the first interface and an inside diameter of the cylinder bore being cooperative to receive an interface member end cap, and a surface of the interface member end cap providing a stop for the piston section of the shaft member; and
a drive cap being disposed on a surface of the second interface of the block, the drive cap being rotatable by the electric motor, and rotation of the drive cap rotates the shaft member through the interface while permitting translational movement of the shaft member.

30. A molding system as in claim 29 wherein:
the electric motor includes a hollow shaft; and
an end of the operational member includes a section for receiving a second piston member, the second piston member being retained by a shoulder formed on a section engaging an end surface of the second piston member and a piston member end cap being secured to the end of the operational member, an outer diameter of the second piston member being sized to ensure the second piston member fits within the hollow shaft of the electric motor,
the hollow shaft of the electric motor forming a cylinder, and the second piston member being configured to reciprocate within the cylinder during operation.

31. A molding system as in claim 30 wherein;
an interface portion of the drive cap includes a spline for complementary engagement with the spline of the operational member.

32. A molding system as in claim 30 wherein:
a carriage mount interconnects a carriage and a barrel to the first interface of the block.

33. A molding system as in claim 29, wherein:
the electric motor includes a hollow shaft; and
the drive cap communicates with a rotor of the hollow shaft for rotation of the drive cap.

34. A molding system as in claim 30 wherein:
the piston member end cap includes a central opening to receive a position sensor for determining a position of the shaft member.

35. A molding system as in claim 34 further comprising:
the electric motor includes:
   a stator;
   a hollow shaft rotor being configured to interact with the stator; and
   a mount for securing the electric motor to the block at the second interface, the hollow shaft rotor engages the drive cap such that rotation of the hollow shaft rotor provides a rotation of the drive cap.

36. A molding system as in claim 29 wherein the at least one fluid circuit is formed directly in material of the block.

37. A molding system as in claim 29 wherein the at least one fluid circuit includes internal circuits formed directly in material of the block and external circuits connected to the block.

38. A molding system as in claims 29, 30, or 31 further comprising:
   at least one energy storage device port, the at least one energy storage device port in communication with the at least one fluid circuit.

39. A molding system as in claim 38 wherein the at least one energy storage device port is integral with the block.

40. A molding system as in claim 38 wherein the at least one energy storage device is mounted on the at least one energy storage device port.

41. A molding system as in claims 29, 30, 31, or 32 further comprising:
   at least two energy storage devices, the at least two energy storing devices in communication with the at least one fluid circuit.

42. A molding system as in claim 41 where the at least two energy storing devices have different capacities for storing energy.

43. A molding system as in claim 41 wherein the at least two energy storing devices have the same capacities for storing energy.

44. A molding system as in claim 41 wherein the at least two energy storing devices are aligned to the same fluid circuit.

45. A molding system as in claim 41 wherein the at least two energy storing devices are aligned with different fluid circuits.

46. A molding system as in claim 29 wherein the at least one output port in communication with a valve to control, in use, a flow of fluid.

47. A molding system as in claim 46 wherein the valve is integral with the block.

48. A molding system as in claim 46 wherein the valve is directed coupled with the block.

49. A molding system as in claim 46 wherein the valve is indirectly coupled with the block.

50. A molding system as in claims 46, 47, 48, or 49 wherein the valve is a proportional valve.

51. A molding system as in claims 46, 47, 48, or 49 wherein the valve is a non-proportional valve.

52. A molding system as in claim 29 further comprising:
   a position sensor for determining, in use, a position of the operational member.

53. A molding system as in claim 52 wherein the position sensor is a rod and the piston section includes an axial bore to house an end of the rod.

54. A molding system as in claim 40 wherein the translatable member is a screw in a barrel of an injection unit, for injecting, in use, a shot of melt into a mold.

* * * * *